United States Patent [19]

Backaus et al.

[11] Patent Number: 5,694,459
[45] Date of Patent: Dec. 2, 1997

[54] PERSONALIZED INFORMATION SERVICE SYSTEM

[75] Inventors: Marjorie Susan Backaus, Morristown, N.J.; Claire Darcelle Barrera, Boulder, Colo.; Esther Lee Davenport, Holmdel; Harold Fahrer, Denville, both of N.J.; Barry Norman Ostroff, Westminster, Colo.; Robert Petrelli, East Brunswick, N.J.; Susan Kay Sonke, Superior, Colo.

[73] Assignee: AT&T, Middletown, N.J.

[21] Appl. No.: 785,424

[22] Filed: Jan. 16, 1997

Related U.S. Application Data

[63] Continuation of Ser. No. 538,109, Oct. 2, 1995, which is a continuation of Ser. No. 121,123, Sep. 14, 1993.

[51] Int. Cl.[6] .......................... H04M 15/00; H04M 3/00; H04M 3/42
[52] U.S. Cl. .................. 379/427; 379/120; 379/121; 379/245; 379/246; 379/207
[58] Field of Search ........................ 379/88, 97, 127, 379/142, 118, 120, 121, 201, 207, 213, 216, 233, 245, 246

[56] References Cited

U.S. PATENT DOCUMENTS

| | | | |
|---|---|---|---|
| 4,734,931 | 3/1988 | Bourg | 379/216 |
| 4,811,382 | 3/1989 | Sleevi | 379/202 |
| 4,850,007 | 7/1989 | Marino | 379/112 |
| 4,896,346 | 1/1990 | Belfield | 379/201 |
| 4,942,598 | 7/1990 | Davis | 379/216 |
| 4,979,206 | 12/1990 | Padden | 279/213 |
| 4,996,704 | 2/1991 | Brunson | 379/245 |
| 5,163,084 | 11/1992 | Kim | 379/97 |
| 5,164,981 | 11/1992 | Mitchell | 379/97 |
| 5,181,238 | 1/1993 | Medamana | 379/97 |
| 5,187,710 | 2/1993 | Cheu | 379/114 |
| 5,204,894 | 4/1993 | Darden | 379/213 |
| 5,208,848 | 5/1993 | Pula | 379/97 |
| 5,218,631 | 6/1993 | Katz | 379/97 |
| 5,219,689 | 5/1993 | O'Sullivan | 379/201 |
| 5,222,120 | 6/1993 | McLeod | 379/201 |
| 5,259,023 | 11/1993 | Katz | 379/97 |
| 5,274,695 | 12/1993 | Green | 379/88 |
| 5,278,897 | 1/1994 | Mowery | 379/207 |
| 5,305,375 | 4/1994 | Sagara | 379/97 |
| 5,311,572 | 5/1994 | Friedes et al. | 379/201 |
| 5,369,685 | 11/1994 | Kero | 379/88 |
| 5,418,846 | 5/1995 | Morrisey et al. | 379/216 |

OTHER PUBLICATIONS

"Modeling and Formal Specification of the Personal Communication Service", Desbiens et al., *IEEE INFOCOM*, vol. 2, 28 Mar. 1993, San Francisco, CA, U.S. pp. 756–765.

"Das intelligents Netz ermoglicht neue Dienste und Anwendungen" Kruger, *Nachrichten Teschnisch Zeitschrift*, vol. 45, No. 4, Apr. 1991, Berlin (DE) pp. 254–261.

(List continued on next page.)

*Primary Examiner*—Curtis Kuntz
*Assistant Examiner*—Vijay Shankar
*Attorney, Agent, or Firm*—Robert B. Levy

[57] ABSTRACT

A high-speed information service system is provided which uses a unique identifier received during call setup to retrieve automatically a personalized profile for an information service subscriber. The identifier uniquely identifies the subscriber, thereby allowing the information retrieval process to begin immediately after the call is setup. The system utilizes Integrated Services Digital Networks (ISDN) signaling and temporary, "out-of-band" signaling to improve information retrieval capability. ISDN signaling permits electronic addressing of information requested by the subscriber, thereby eliminating the delays which accompany DTMF signal processing. Communications between an information service provider and an individual information source are conducted using out-of-band signaling. That is, call setup and information request are processed using a channel other than the channel which carries data between the information service provider, the information source and the subscriber.

3 Claims, 2 Drawing Sheets

OTHER PUBLICATIONS

"*Interactive Voice Technology Applications*", Fischell et al. *AT&T Technical Journal*, vol. 69, No. 5, 1990, Sep./Oct., pp. 61–76.

"*Intelligent Networking and Service in the Business Communications Environment*", Aritaka et al., *International Switching Symposium, Paper B8.3*, vol. 5, 18 May 1990, Stockholm (SW) pp. 147–152.

"*Interaction of the ISUP Supplementary Services with the Intelligent Network*", Mueller et al., *Annual Review of Communications, –National Engineering Consortium*, vol. 46, 1992, pp. 605–612.

UK Patent Application GB 2 263 845 as cited in EPO Search Report dated Dec. 18, 1995 regarding EPO Application No. 94 30 6560.

WO –A–91 16779 (Telecom USA, Inc.) as cited in EPO Search Report dated Dec. 18, 1995 regarding EPO Application No. 94 30 6560.

PERSONALIZED INFORMATION SERVICE SYSTEM

This application is a continuation of application Ser. No. 08/538,109, filed on Oct. 2, 1995, which is a continuation of application Ser. No. 08/121,123, filed on Sep. 14, 1993.

TECHNICAL FIELD

This invention relates to information services systems and, more particularly, to information services systems which process information requests received via telephone lines.

BACKGROUND OF THE INVENTION

Currently available information services systems permit a subscriber to the service to obtain information about subscriber-selected topics, such as weather, sports, and stock prices. Several systems enable the subscriber to access the desired information in real-time, via telephone lines. Typically, the subscriber requests information by entering keystrokes from a telephone keypad to transmit a sequence of dual-tone multifrequency (DTMF) telephone signals. The DTMF tones are received at a central processor operated by an information service provider. The information service provider then places one or more telephone calls to various information sources, also via DTMF signaling, to obtain the requested information. The information service provider then transmits the requested information back to the subscriber.

Existing information retrieval systems, however, suffer several performance disadvantages. In particular, the subscriber must endure long delays while the information service provider obtains information from the subscriber prior to obtaining the requested information from the information sources. The information retrieval process is slow because the information service provider must first verify the subscriber's identity and receive instructions specifying information to be retrieved for the subscriber. For example, the subscriber often must enter an authorization code prior to gaining access to the information retrieval service.

SUMMARY OF THE INVENTION

A high-speed information service system is provided which overcomes the deficiencies of the prior art by responding to a subscriber identifier, which uniquely identifies a subscriber, to automatically retrieve a record which identifies preselected information to be provided to the subscriber. The subscriber identifier is received during call setup of an information services request telephone call.

In an exemplary embodiment of the invention, the subscriber's special services telephone number (such as the subscriber's EasyReach® 700 number) is passed to the information service provider, for use as the subscriber identifier, as part of the call setup process to enable processing to begin without delay as soon as the call is established. The subscriber identifier is used to retrieve a unique subscriber profile which identifies, for example, the information the subscriber wishes to receive, alternative or special information profiles, and the subscriber's preferred billing arrangement.

DETAILED DESCRIPTION

Figure 1:
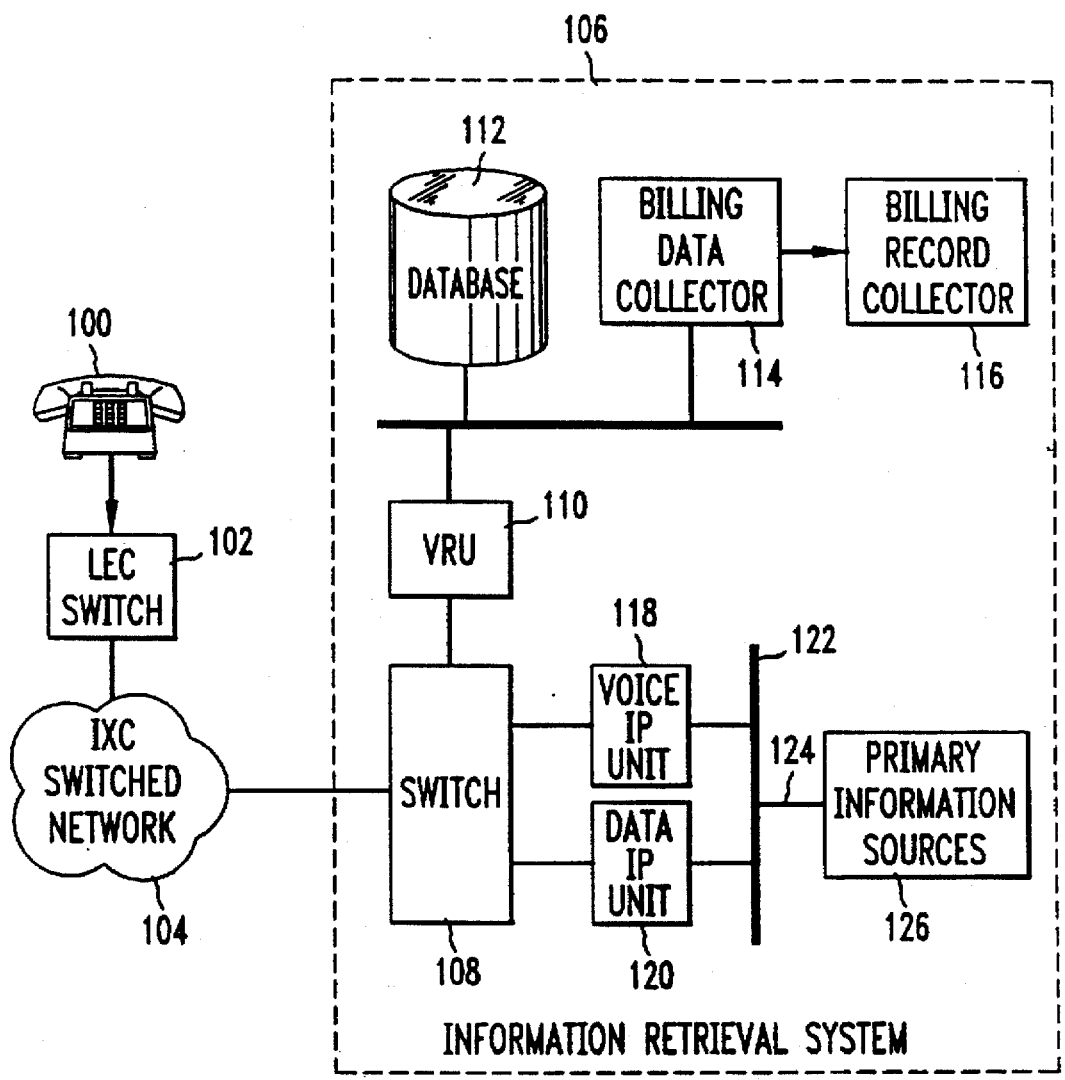
FIG. 1 is a block diagram of an information service system constructed in accordance with the principles of the invention.

FIG. 1 shows a block diagram of a communications system in which calls placed from a telephone station 100 are extended to a local exchange carrier (LEC) switch 102 and switched through an interexchange carrier (IXC) switched network 104 to an information retrieval network 106. Calls switched between telephone station 100 and IXC switched network 104 are transmitted on conventional telephone circuits and, of course, can be routed directly to IXC switched network 104 without passing through a LEC switch. The interface between IXC switched network 104 and information retrieval network 106 is a "800 MegaCom Info 2" interface, offered by American Telephone & Telegraph Co., Inc. (AT&T). As described below, calls switched between IXC switched network 104 and information retrieval network 106 are transmitted on PRI-ISDN channels, which illustratively comprise 23 ISDN B-channels and one ISDN D-channel. Information retrieval network 106 includes a switch 108, a voice response unit (VRU) 110, a database 112, a billing data collector 114, a billing record collector 116 and information processing (IP) units 118 and 120.

VRU 110, database 112 and switch 108 (also referred to collectively as the "information service provider") collectively operate as an interface with the subscriber. Switch 108 illustratively is a private branch exchange switch, manufactured by AT&T. Switch 108 performs the switching functions necessary for communications between the subscriber, VRU 110, and IP units 118 and 120. VRU 110, which illustratively is an AT&T Conversant® speech processor, communicates with the subscriber and collects DTMF digits (tones) transmitted by the subscriber. VRU 110 also sends information requests and other commands, via switch 108, to IP units 118 and 120.

In accordance with the invention, database 112 stores a personalized information request profile (also referred to as a "subscriber profile") for each subscriber. For each call switched to information retrieval network 106, database 112 downloads a copy of a subscriber's profile to VRU 110 as part of the call setup routine. The appropriate subscriber profile is selected in response to a unique subscriber identifier.

IP units 118 and 120 are the elements in the system which deliver, or "speak," the requested information to the subscriber. IP units 118 and 120 illustratively are implemented as AT&T Conversant® speech processors, and are coupled to a local area network (LAN) 122. The IP units receive data from primary information source 126, for example, in the form of compressed digitized speech. IP units 118 and 120 receive the data via an information feed line 124 coupled to LAN 122. Although only two IP units are shown in FIG. 1, it is to be understood that many such units could be connected to switch 108. In an exemplary system (not shown), a separate IP unit would be provided for each class of information topics (e.g., sports, news, investments, weather).

IP units illustratively are of one of two forms, namely, "voice" units or "data" units. Voice IP unit 118 provides information in the form of continuous speech. Voice IP unit 118 is useful, for example, for delivering news announcements. Data IP unit 120 concatenates stored speech with data. For example, data IP unit 120 would concatenate "The price of XYZ stock is" (stored speech) with "24" and ½

(data). Typical applications for data IP units are to give lottery results, sports scores, and investment prices. Notwithstanding the above, the IP units of the invention alternatively could be human attendants who respond directly to a subscriber, for example, to sell tickets to a concert or sporting event.

Billing data collector 114 collects billing information for services provided by information retrieval network 106. Billing data collector 114 receives from VRU 110 and database 112 information such as the subscriber's EasyReach® 700 number or automatic number identifier (ANI), the subscriber's billing preference (discussed with respect to FIG. 2, below), the number of minutes of service provided, and special billing rates to be applied to special classes of information services. Billing data collector 114 packages this information in a conventional manner to generate call billing records. The call billing records are provided to a conventional billing record collector 116.

Figure 2:
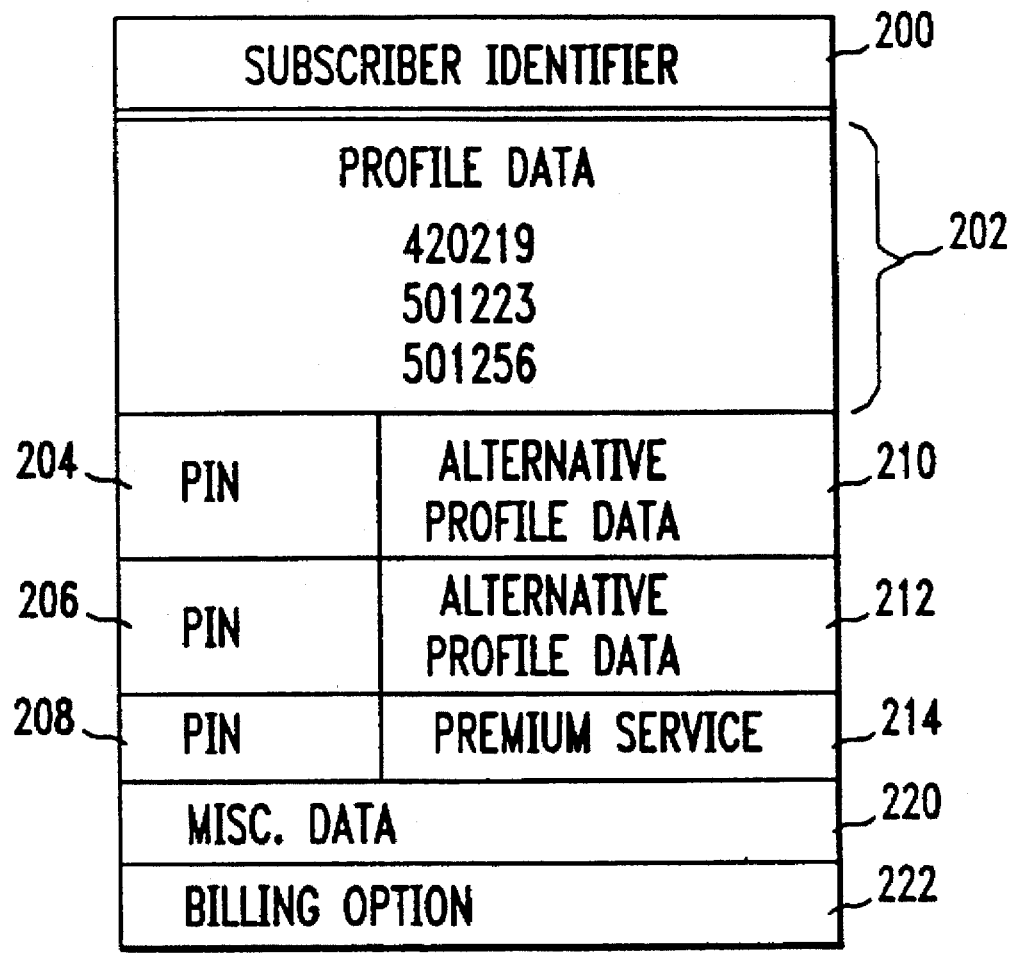
FIG. 2 shows an illustrative subscriber profile record constructed in accordance with the invention.

FIG. 2 illustrates an exemplary subscriber profile constructed in accordance with the principles of the invention. The subscriber profile includes a "Subscriber Identifier" field 200 which stores a unique subscriber identifier, such as the subscriber's special services telephone number (e.g., the subscriber's EasyReach® 700 number) or the subscriber's ANI, and a "Profile Data" field 202, which stores symbols which identify information the subscriber wishes to receive. The subscriber profile may include one or more application-specific personal identification numbers (PINs) 204, 206, 208, which activate respective special profiles 210, 212, 214. Special profiles 210, 212, and 214 specify alternative profile data to the data stored in Profile Data field 202. The special profiles allow a subscriber to maintain, for example, a primary profile for personal use, a second profile 210 for business use (activated by PIN 204), and a third profile 212 for use when traveling abroad (activated by PIN 206). Special profile 214 may designate a premium information service available to the subscriber for an additional charge. The subscriber profile also may include a data field 220 which stores information used by the information service provider, such as market segmentation data. A "Billing Option" field 222 may be provided to indicate the subscriber's billing preference, that is, whether the bill for the information retrieval service should be part of the LEC bill, delivered as a separate bill, charged to the subscriber's consumer credit card, or charged in some other suitable payment arrangement.

Profile data field 202 identifies one or more data items to be delivered to the subscriber each time the profile is played. Each data item is identified by a unique data element identifier or symbol. For example, the price of AT&T stock may be identified by the symbol 420219, the weather in New York City identified by the symbol 501223, and the weather in Los Angeles identified by the symbol 501256. As described below, VRU 110 transmits this identifying symbol (via an ISDN D-channel) to one of IP units 118 and 120, so that the appropriate IP unit can provide the data to the subscriber via an ISDN B-channel. VRU 110 transmits the symbol to the IP unit as a single binary word, thereby achieving a considerable performance advantage over DTMF systems which must transmit symbols as a sequence of DTMF tones.

Referring again to FIG. 1, the operation of the information retrieval system of the invention will now be described. Information service calls from IXC switched network 104 are transmitted to switch 108, which routes the call from the subscriber to VRU 110 over an ISDN B-channel. VRU 110 uses selected information passed by switch 108 during call setup, in accordance with the invention, to access database 112 to obtain the subscriber profile. More particularly, VRU 110 advantageously uses information which uniquely identifies the subscriber, such as the subscriber's EasyReach® 700 number, to query database 112 at an early stage of the call. VRU 110 uses this unique identifier to obtain the subscriber's profile even before any messages are played to the subscriber or DTMF digits are collected from the subscriber, thereby speeding processing of the subscriber's information request.

Passing a unique subscriber identifier to information retrieval system 106 automatically when processing an information services request telephone call can be used advantageously to provide an element of system security. For example, access to the information retrieval system can be limited to entry from a predetermined platform, such as the AT&T EasyReach® 700 platform. Using the subscriber identifier in this manner eliminates the need to query the subscriber for an authorization code, thereby further simplifying and speeding the information delivery to the subscriber.

Having obtained a copy of the subscriber's profile, VRU 110 responds to the subscriber via switch 108 and IXC switched network 104. In an exemplary embodiment, VRU 110 recites the subscriber's profile and requests input from the subscriber which would identify selections from a menu. The menu typically may give the subscriber the option of: (1) listening to information specified by the subscriber's profile, (2) browsing through information services not pre-programmed in the subscriber's profile (referred to as "browse" mode), or (3) performing administrative functions such as adding or deleting information items from the subscriber's profile, or reviewing the subscriber's profile. The subscriber selects menu items using conventional DTMF signaling.

When the subscriber chooses to listen to the profile (e.g., listen to the weather, sports scores, etc.), VRU 110 places a second call through switch 108 to an appropriate IP unit, illustratively unit 118. As described below, the second call is placed over PRI-ISDN D-channel circuits using, for example, ISDN Call Control Protocol Q.931. At the same time, switch 108 bridges the subscriber directly to IP unit 118 via an ISDN B-channel to facilitate high-speed data transfer. (VRU 110 may remain bridged to the subscriber via the B-channel or may drop from the connection, leaving the subscriber and IP unit 118 connected via the B-channel.) IP unit 118 then "plays" the information thus identified to the subscriber via the B-channel. After the information has been delivered to the subscriber, IP unit 118 sends a message to VRU 110 indicating that transmission is complete, so that VRU 110 can tear down the connection with IP unit 118 (while maintaining the B-channel connection between VRU 110 and the subscriber). VRU 110 then establishes a new connection with IP unit 120, if necessary, to deliver additional data items specified in the subscriber profile. When all information specified in the profile has been delivered, VRU 110 preferably returns the subscriber to the menu.

Bridging the subscriber and IP unit via a B-channel gives the subscriber greater control over the information retrieval process. Bridging the B-channels enables the subscriber to send DTMF signals directly to IP unit 118. The subscriber can signal the IP unit to add new data elements to the subscriber's profile while the subscriber listens to information in the "browse" mode. Also, the subscriber can communicate directly with the IP unit to control the flow of information. For example, the subscriber can signal the IP unit to pause, repeat an entire data element, repeat a selected portion of an element, or terminate the information presentation and return control to VRU 110.

As described above, VRU 110 communicates with the IP units using out-of-band, call-associated temporary signaling. In particular, VRU 110 uses an ISDN D-channel to send instructions to IP unit 118 to obtain the information requested by the subscriber. The D-channel signaling is referred to herein as "call-associated, temporary signaling" because VRU 110 establishes and tears down the B-channel connection each time it communicates with a different IP box, even though VRU 110 maintains the B-channel connection with the subscriber until the subscriber terminates the call.

Out-of-band, call-associated temporary signaling techniques are less susceptible to errors than in-band DTMF signaling techniques. For example, in-band DTMF signaling is subject to errors resulting from human speech emulation of DTMF signals (commonly known as "talk-off"). The digital signals of an ISDN message are transmitted outside of the voiceband channel, and cannot be mistaken for DTMF tones.

Out-of-band, call-associated temporary signaling techniques also allow application-specific information and commands to pass between VRU 110 and IP unit 118 without interrupting data delivery from the IP unit to the subscriber. This overcomes a deficiency in the prior art in-band DTMF signaling techniques of existing information retrieval systems, which required control instructions such as application-specific data to be transferred only during pauses in the call (i.e., when data was not being transferred to a subscriber). Out-of-band signaling greatly increases information retrieval rates because it enables real-time information transfers between VRU 110 and IP unit 118. Out-of-band signaling also enables the signaling between VRU 110 and IP unit 118 to take place concurrently to signaling between VRU 110 and the subscriber and to signaling between IP unit 118 and the subscriber. The information service provider communicates with the subscriber over one channel and communicates with the information source over a different channel. Using the D-channels to perform temporary signaling in this manner, rather than using DTMF signaling, produces faster information retrieval without long pauses between the playing of data elements. Combined with automatic identification of the subscriber profile using the subscriber identifier, temporary signaling results in hands-free operation for the subscriber.

It will be apparent to one skilled in the art that other modifications can be made to the described embodiments without departing from the scope of the invention. For example, in addition to receiving a unique subscriber identifier during call setup, VRU 110 may also copy other information from the call setup messages which enables VRU 110 to perform special information processing functions. For instance, VRU 110 can use the ANI of telephone station 100 to automatically provide the subscriber with the local weather report for the area in which the call originated by passing the ANI to the IP unit with the appropriate data element identifier. Also, is to be understood that "telephone calls" and "voice" communications are to be construed broadly and may include, for example, multimedia (voice and video) communications.

We claim:

1. A method for use with an information service system that provides different types of information to a subscriber in response to an information services request telephone call placed by the subscriber through a telecommunications network, the method comprising the steps of storing a record in accordance with a subscriber's personal preference that identifies preselected types of information to be provided to the subscriber;

establishing, in the telecommunications network, the identity of the subscriber who initiated an information services request telephone call by dialing a telephone number uniquely assigned to the subscriber, the identity of the subscriber determined from the subscriber's unique telephone number;

correlating the identity of the subscriber, as established from the subscriber's unique telephone number, to a corresponding stored record to establish the personal preference of the subscriber initiating the information services request telephone call prior to completing set up of the call initiated by the subscriber to the information services system; and completing set up of the call initiated by the subscriber to the information services system after the subscriber's personal preference has been established to enable the subscriber to receive information in accordance with the subscriber's personal preference.

2. The method according to claim 1 wherein the record is stored in the information services system.

3. The method according to claim 1 wherein the information corresponding the subscriber's personal preference is automatically retrieved upon completion of set up of the call initiated the subscriber to the information services system.

* * * * *